(12) United States Patent
Krieft

(10) Patent No.: US 12,370,938 B2
(45) Date of Patent: Jul. 29, 2025

(54) APPARATUS AND METHOD FOR CAPTURING SURROUNDINGS OF A VEHICLE

(71) Applicant: HELLA GmbH & Co. KGaA, Lippstadt (DE)

(72) Inventor: Florian Krieft, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 170 days.

(21) Appl. No.: 18/130,224

(22) Filed: Apr. 3, 2023

(65) Prior Publication Data

US 2023/0311741 A1 Oct. 5, 2023

(30) Foreign Application Priority Data

Apr. 4, 2022 (DE) .................... 10 2022 107 950.3

(51) Int. Cl.
| | |
|---|---|
| *B60G 1/04* | (2006.01) |
| *B60Q 1/04* | (2006.01) |
| *G01B 11/25* | (2006.01) |
| *H04N 23/56* | (2023.01) |

(52) U.S. Cl.
CPC ............ *B60Q 1/04* (2013.01); *G01B 11/2513* (2013.01); *H04N 23/56* (2023.01)

(58) Field of Classification Search
CPC ........ B60Q 1/04; B60Q 1/00; G01B 11/2513; H04N 23/56; G01S 7/484; G01S 17/894; G01S 17/931
See application file for complete search history.

(56) References Cited

U.S. PATENT DOCUMENTS

| | | | |
|---|---|---|---|
| 10,632,899 B2 | 4/2020 | Neukam | |
| 2019/0039502 A1* | 2/2019 | Licht | .................... F21S 41/00 |
| 2019/0195991 A1* | 6/2019 | Miki | .................... G01S 17/931 |

FOREIGN PATENT DOCUMENTS

| | | |
|---|---|---|
| DE | 102009007408 A1 | 8/2010 |
| DE | 102016006390 A1 | 11/2017 |
| DE | 102017109550 A1 | 11/2018 |

* cited by examiner

*Primary Examiner* — Sang H Nguyen
(74) *Attorney, Agent, or Firm* — Muncy, Geissler, Olds & Lowe, P.C.

(57) ABSTRACT

An apparatus for capturing surroundings of a vehicle, which includes an illumination unit for emitting light pulses into surroundings, an optical capture unit for detecting the surroundings, an evaluation unit for evaluating a detection signal recorded by the optical capture unit. The illumination unit is designed such that at least two light pulses are periodically emitted, luminous areas of the light pulses having light patterns designed to be complementary to each other. The optical capture unit being controlled such that it captures an illumination area illuminated by the light pulses as a detection image synchronously with the emission of the light pulses.

15 Claims, 2 Drawing Sheets

APPARATUS AND METHOD FOR CAPTURING SURROUNDINGS OF A VEHICLE

This nonprovisional application claims priority under 35 U.S.C. § 119 (a) to German Patent Application No. 10 2022 107 950.3, which was filed in Germany on Apr. 4, 2022, and which is herein incorporated by reference.

BACKGROUND OF THE INVENTION

Field of the Invention

The invention relates to an apparatus for capturing surroundings of a vehicle, which includes an illumination unit for emitting light pulses into surroundings, an optical capture unit for detecting the surroundings, an evaluation unit for evaluating a detection signal recorded by the optical capture unit.

The invention further relates to a method for capturing surroundings of a vehicle, light pulses being sent to surroundings of the vehicle, and the surroundings being optically captured, a captured detection image of the surroundings being evaluated for the purpose of providing sensor data.

Description of the Background Art

An apparatus for capturing surroundings of a vehicle is known from DE 10 2009 007 408 A1, which includes an illumination unit for emitting light pulses as well as an optical capture unit for detecting light pulses reflected on an object in the surroundings. The optical capture unit is designed as a 3D camera. The detection signal of the optical capture unit is evaluated in an evaluation unit in such a way that the distance of, and thus the distance to, the object may be calculated from the propagation time of the light pulse detected by the optical capture unit. The evaluation signal ascertained in this way may be used, for example, for a parking aid, autonomous parking, parking space measurement, a door opening warning, etc. The known illumination unit is arranged for this purpose in the region of an external mirror, a rear region, and/or a front region of the vehicle. For example, the illumination unit may be integrated into an existing headlamp or a luminaire of the vehicle.

An apparatus for capturing surroundings of a vehicle is known from DE 10 2017 109 550 A1, which comprises a LIDAR sensor, which is integrated into a side mirror of the vehicle. The presence of objects or a distance to the object in the surroundings may be ascertained from the propagation time of the emitted and reflected light beam pulse.

Since the capture of surroundings is becoming increasingly more important, in particular with regard to self-driving vehicles, it is desirable to have additional redundancies for the surroundings capture or an improved database for the surroundings capture.

SUMMARY OF THE INVENTION

It is therefore an object of the present invention to provide an apparatus and a method for capturing surroundings of a vehicle in such a way that a capture of surroundings of a vehicle is ensured in a space-saving and installation space-saving way.

To achieve this object, the invention is characterized in that the illumination unit is designed in such a way that at least two light pulses are periodically emitted, luminous areas of the light pulses having light patterns designed to be complementary to each other, the optical capture unit being controlled in such a way that it captures an illumination area illuminated by the light pulses as the detection image synchronously with the emission of the light pulses.

The particular advantage of the invention is that, by sending at least two light pulses, which each have a different light pattern running in a complementary manner to each other, a sensor light may be emitted, which is canceled out so that only one homogeneous luminous spot is emitted into the area in front of the vehicle without any differences in illumination intensity. The light pulses therefore do not have an interfering effect on the surroundings of the vehicle. Due to the fact that an optical receiving unit may be placed into a detecting state (brief activation state) synchronously with the emission of the light pulses, an image of the light pulse may be generated in the area in front of the vehicle and evaluated in an evaluation unit. The ascertained evaluation signal may then be used to support further surroundings sensors or to support the latter under certain ambient conditions, for example, in heavy fog. Exactly two different light pulses are preferably emitted, a first light pattern of a first light pulse being complementary to a second light pattern of a second light pulse. The second light pulse thus forms a negation with respect to the first light pulse.

The illumination unit preferably includes an imaging characteristic, for example a lens, so that, based on a light source made up of multiple elements arranged in a matrix-like manner, an emitted luminous area having a first light pattern is generated for the first light pulse, in which a first partial region is illuminated and a second partial region is not illuminated. The second light pattern of the second light pulse has a luminous area of the same size, the first partial region not being illuminated and the second partial region being illuminated. Alternatively, the partial regions may also be controlled by a matrix-like panel of micromirrors or liquid crystal elements instead of the light source elements.

The light pattern can be made up of a predefined luminous area mapped onto the area in front of the vehicle and made up of a number of luminous section and non-luminous sections. The non-luminous sections of the light area have an illumination intensity which is approximately zero. The luminous sections of the light area have an illumination intensity which exceeds a predefined threshold value. The threshold value is dependent on the surroundings parameter to be detected. After all, the geometric variation of the luminous and non-luminous sections of the emitted light pulses in relation to the received light pulses determines the meaningfulness of the evaluation signal.

The luminous areas and non-luminous areas of the light patterns can be designed as strips. Multiple strips can be arranged next to each other, luminous strips and non-luminous strips being provided in an alternating manner. A variation of the surroundings parameter may be easily ascertained hereby.

The illumination unit can be designed as a headlamp, which includes a light source and an optical unit, with the aid of which a predefined light distribution, for example, a low-beam distribution, may be generated. A sensor light formed by the first light pulse and the second light pulse is thus combined together with a useful light generating the light distribution. The sensor light is emitted at a pulse frequency which is greater than a predefined threshold value (flicker fusion frequency), so that the sensor light or the light pattern of the light pulses is imperceptible to the human eye. The threshold frequency is preferably greater than 60 Hz. When controlling the headlamp according to the invention, the latter may advantageously be used not only to generate a light distribution (useful light) but also to generate light pulses (sensor light). Since the light pulses form luminous areas arranged in a complementary manner to each other, the mapping of a light pattern which interferes with the useful light is prevented. The superimposition of the two complementary light patterns generates a homogeneous illumination area.

The illumination unit can be controlled in such a way that the time interval in which the complementary light pulses are emitted, is significantly smaller than the time interval in which the useful light for generating the light distribution is emitted. The pulse frequency of the light pulses is thus significantly higher than the pulse repetition frequency thereof. The pulse degree may be, for example, 10%.

The first light pattern and the second light pattern can each be designed as a light distribution pattern, so that the predefined light distribution of the headlamp may be mapped by superimposing the first light pulse and the second light pulse. The first and second light pulses are continuously emitted at the pulse frequency. A steady light is not present here. In this embodiment, the sensor light and the useful light are emitted simultaneously.

To further achieve the object, the invention is also characterized in that different light patterns designed to be complementary to each other are emitted periodically at a pulse frequency, luminous sections of the one light pulse overlapping with non-luminous sections of the other light pulse, the pulse frequency being selected to be of a level that the change of the light sections and non-light sections between the emitted light pulses is imperceptible to the human eye, a detection image of the surroundings being captured synchronously with the emission of the light pulses, so that, by comparing a detected first light pattern of a first light pulse with the emitted first lightly pattern of the same light pulse, an evaluation signal is generated, which signals changes in the surroundings.

According to the method according to the invention, an equal number of first light pulses and second light pulses may be periodically emitted, the first light pulse emitting a luminous area having a first light pattern, and the second light pulse emitting a luminous area having a second light pattern designed to be complementary to the first light pattern. The complementary design of the first light pattern and the second light pattern causes the first light pattern and second light pattern made up of different luminous sections and non-luminous sections to be imperceptible to the human eye in the area in front of the vehicle, since they are superimposed to form a homogeneous luminous area. Due to the fact that the pulse frequency is higher than a threshold frequency, the change in the light patterns is imperceptible to the human eye. Only one homogeneous luminous area is thus mapped.

At least one pair of a first light pulse and a second light pulse can be emitted within one pulse repetition period, a steady light being emitted before and after the emission of the pair of the first light pulse and the second light pulse, including a number of luminous sections used to generate the light distribution of the headlamp. During a pulse repetition period, a sensor light is generated, on the one hand, with the aid of the light pulses, and a useful light is generated, on the other hand, by controlling the light-emitting elements (matrix of light sources, matrix of micromirror elements, matrix of liquid crystal elements). The headlamp thus has a dual function. It is used, on the one hand, to generate sensor light, with the aid of which sensor data for detecting the vehicle surroundings may be collected, and on the other hand, to generate useful light, with the aid of which the predefined light distribution may be generated.

Light-emitting and/or light-mapping elements of the illumination unit can be controlled in such a way that only light pulses having light patterns designed to be complementary to each other are emitted. The desired light distribution is generated by superimposing the light patterns. A simultaneous control of useful and sensor light advantageously takes place, which reduces the control complexity.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
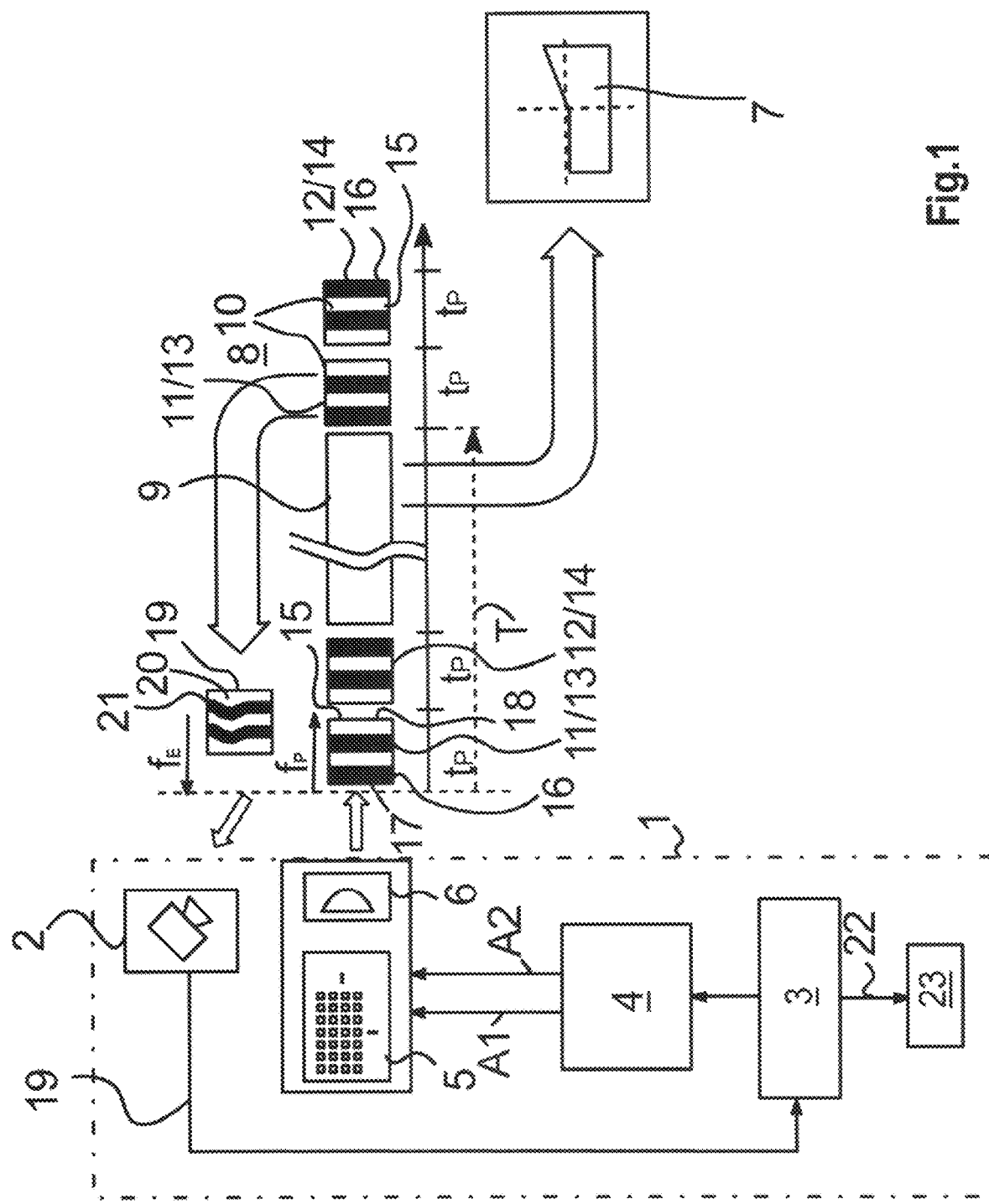
FIG. 1 shows an apparatus for capturing the surroundings according to a an example.

An apparatus according to the invention for capturing the surroundings of a vehicle F essentially includes an illumination unit 1, an optical capture unit 2, an evaluation unit 3, as well as a control unit 4.

Illumination unit 1 is preferably designed as a headlamp, which is arranged in a front region of vehicle F. Illumination unit 1 is preferably designed as a high-resolution headlamp, which includes a plurality of light sources 4 (LED light sources) arranged in a matrix-like manner and a light-mapping lens 6 irradiated by light sources 5. Alternatively, illumination unit 1 may also be formed by an individual light source and a micromirror arranged having a plurality of individually connectible microoptical elements or a liquid crystal arrangement having a plurality of individually controllable liquid crystal elements. Illumination unit 1 may be controlled by control unit 4 in such a way, the individual light sources 4 (light-emitting elements) being switched on and off in such a way, that a predefined light distribution 7 is mapped to or generated in the surroundings of vehicle F, namely a vehicle front area 8.

Optical capture unit 2 is designed as a camera, for example a monochrome camera or an RGB camera or the like, which is able to detect images of the surroundings of vehicle F or vehicle front area 8. Optical capture unit 2 is oriented toward the surroundings of vehicle F in such a way that it is able to capture light distribution 7 of illumination unit 1 mapped to in vehicle front area 8.

According to a first specific embodiment of the invention, according to FIG. 1 illumination unit 1 is controlled by control unit 4 in such a way that it emits a useful light 9, on the one hand, and sensor light 10, on the other hand. Sensor light 10 is formed by a number of light pulses, which have light patterns running in a complementary manner to each other. In the present exemplary embodiment, sensor light 10 is formed by a first light pulse 11 and a second light pulse 12, which is preferably emitted immediately thereafter, first light pulse 11 forming a luminous area having a first light pattern 13, and second light pulse 12 forming a luminous area having a light pattern 14 designed to be complementary thereto. First light pattern 13 and second light pattern 14 each have strip-shaped luminous sections 15 (white strips in FIG. 1) and strip-shaped non-luminous sections 16 (black strips in FIG. 1).

First light pulse 11 has, for example, on left side 17 of the luminous area formed thereby, a non-luminous area 16, which is adjoined in an alternating manner, in the direction of right side 18, by luminous section 15 and a further non-luminous section 16 up to right side 18, where luminous section 15 is arranged. Second light pattern 14 of second light pulse 12 has a luminous area complementary to first light pattern 13 or a negative luminous area, which begins with a luminous section 15 on left side 17 and is adjoined in an alternating manner by non-luminous sections 16 and luminous sections 15 in the direction of right side 18. Right side 18 is limited by non-luminous section 16. If the two light pulses 13, 14 or the luminous surfaces represented by them, are superimposed, a homogeneous luminous area results, since luminous sections 15 of first light pattern 13 locally overlap with non-luminous sections 16 of second light pattern 14, and non-luminous sections 16 of first light pattern 13 locally overlap with luminous sections 15 of second light pattern 14.

If first light pulse 11 and second light pulse 12 are emitted at a pulse frequency $f_P$, pulse frequency $f_P$ being higher than a threshold frequency of at least 60 Hz, first light pattern 13 and second light pattern 14, including different luminous sections 15 and non-luminous sections 16, are imperceptible to the human eye. The threshold frequency is preferably in a range between 100 Hz or 1000 Hz.

Alternatively, more than two light pulses may be sent if the complementarity is ensured.

First light pulse 11 and second light pulse 12 are sent at a pulse repetition frequency $f_{PF}$ so that useful light 9 is emitted temporally between a pair of first light pulses 11 and second light pulses 12. A pulse repetition period T is thus significantly greater than a pulse duration $t_P$. A pulse degree, which is calculated by the ratio between double pulse duration $t_P$ and pulse frequency period T, is thus less than 20%, preferably less than 10%, in particular less than 5%.

According to the invention, the same illumination apparatus is controlled for the purpose of generating useful light 9 and sensor light 10. For this purpose, control unit 4 includes a controller, so that a sensor control signal A1, on the one hand, and a headlamp light control signal A2, on the other hand, are generated, with the aid of which the plurality of light sources 5 are switched on and off.

Light pulses 11, 12 result in a minimal brightening of light distribution 7 generated by useful light 9.

In order for only light pulses 11, 12 mapped in the surroundings to be detected by optical capture unit 2, and not useful light 9, optical capture unit 2 is controlled synchronously with the emission of light pulses 11, 12, i.e., at pulse frequency $t_P$, so that optical capture unit 2 only records a detection image 19 during pulse duration $t_P$ of first light pulse 11 and/or second light pulse 12. Receiving frequency $f_E$ of optical capture unit 2 is thus of equal size to pulse frequency $f_P$ of light pulses 11, 12. If optical capture unit 2 records, for example, a detection image 19 (illumination area in vehicle front area 8) with a light pattern which has arched luminous sections 20 and arched non-luminous sections 21, at least in regions, instead of emitted straight, stripe-shaped luminous sections 15, 16, detection image 19 used as the detection signal may be evaluated in evaluation unit 3 in such a way that a traffic lane inclination is present in vehicle front area 8. Evaluation signal 22 generated hereby may be conducted, for example, to an actuating device 23, with the aid of which the vehicle body is controlled to compensate for the vehicle unevenness.

Alternatively, detection signal 19 may also be used for the depth distance of the road or to measure the distance of passers-by.

Figure 2:
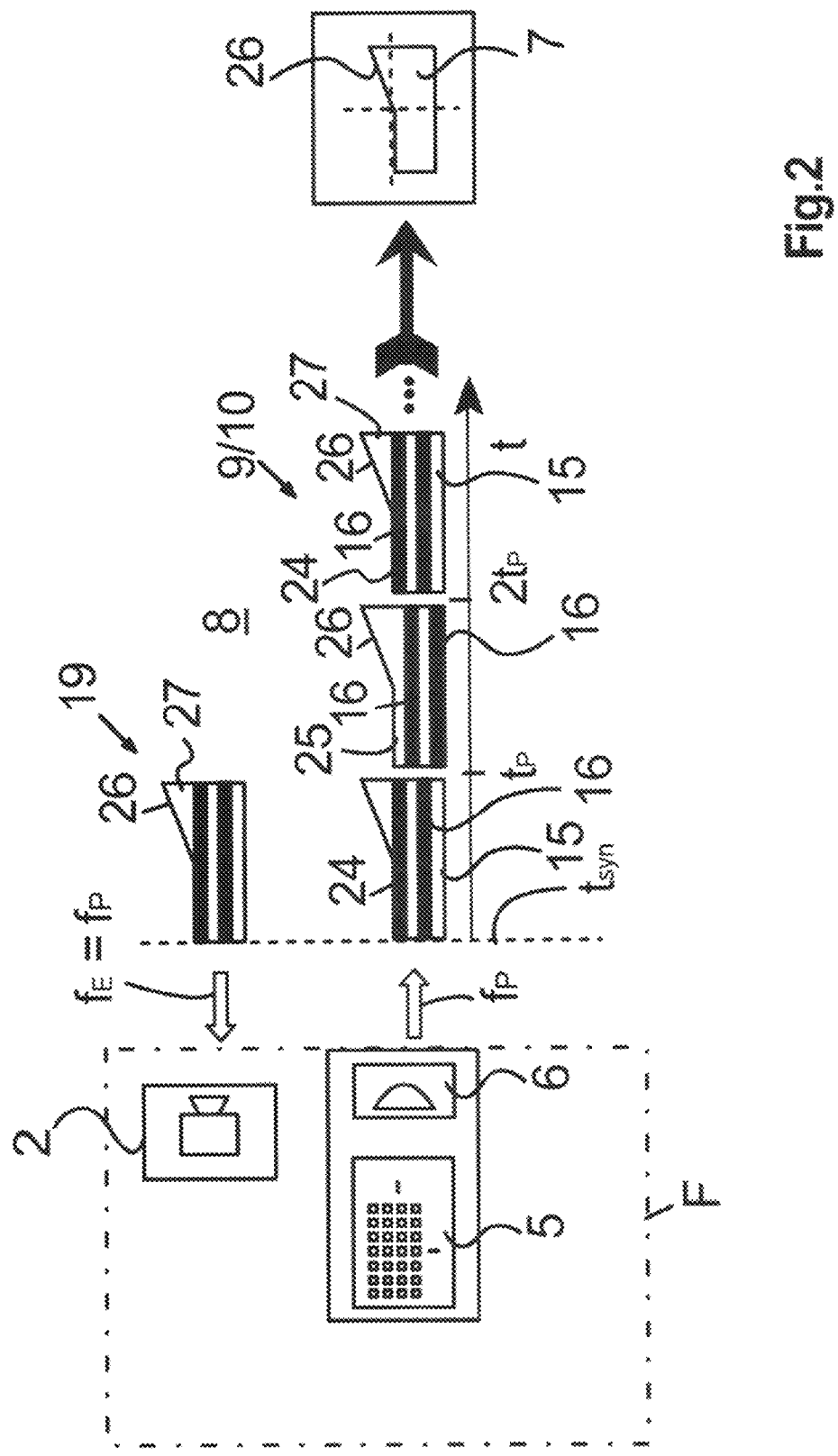
FIG. 2 shows a an apparatus for capturing the surroundings according to an example.

According to an alternative specific embodiment of the invention according to FIG. 2, illumination unit 1 may also be controlled with the aid of control unit 4 in such a way that useful light 9 and sensor light 10 are emitted more or less simultaneously. The light emitted by illumination unit 1 is made up exclusively of a number of preferably pairs of light pulses 11, 12 having light patterns 24 and 25, designed to be complementary to each other, which are superimposed to form desired light distribution 7. These light pulses 11, 12 are emitted preferably at constant pulse frequency $f_P$. As is apparent from FIG. 2, assuming two light pulses 11, 12 having different light patterns 24, 25, the superimposition of first light pulse 11 on second light pulse 12 results in predefined light distribution 7. For this purpose, first light pattern 24 of first light pulse 11 has horizontal non-luminous sections 16, which spatially overlap with light sections 15 of second light pattern 25. Moreover, luminous sections 15 of first light pattern 24 overlap with non-luminous sections 16 of second light pattern 25. Light distribution 7 assumed in the present case, which has an asymmetrical light-dark boundary 26, thus has horizontal, strip-shaped light sections 15 and horizontal strip-shaped non-luminous sections 16, which are arranged in an alternating manner in the vertical direction. In the present case, each light pattern 24, 25 has two luminous sections 15 and two non-luminous sections 16. Only one upper right section of light distribution 7, in which 15° rise 27 in light distribution 7 extends, is defined as a luminous section 27, in which first light pattern 13 and second light pattern 14 generate the same illumination intensity. This portion 28 of light distribution 7 may thus not contribute to detection image 19 captured by camera 2.

In this embodiment of the invention, camera 2 may continuously capture or record detection images 19, so that a rapid geometric variation in luminous sections 15 and non-luminous sections 16 of detection image 19 may be captured.

Receiving frequency $f_E$ of optical unit 2 at which the latter is switched on and off, thus corresponds to pulse frequency $f_P$ of emitted light pulses 11, 12. Camera 2 records detection image 19 which corresponds in the present example with light pulse 11, synchronously with the emission of light pulses 11, 12, for example at synchronous point in time $t_{syn}$.

Also, more than two light pulses may also be emitted, which each have light patterns which are designed to be complementary to each other. If necessary, the light pattern may also be formed by only one single luminous section and one single non-luminous section. The more luminous and non-luminous sections 15, 16 light pattern 13, 14 has, the higher is the resolution for the sensor data provided by detection images 19 and evaluated in the evaluation unit.

Further, the light pattern may have arbitrary geometric shapes and/or symbols and/or representation of objects, whose variation may be evaluated as a result of changes in the surroundings. It is important that, due to the complementary superimposition of the light patterns, the latter are invisible and/or imperceptible to the human eye. Optical receiving unit 2 is more or less used as a decoding unit for decoding the light pattern.

Further, the light pattern may be formed by a hologram, complementary holograms being projected in cycles onto the surroundings.

Optical receiving unit 2 can be designed in such a way that it spatially captures and/or resolves the surroundings or the area in front of the vehicle or a portion thereof. The camera is preferably designed as a monochrome or color camera, which preferably includes CMOS sensors.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for capturing surroundings of a vehicle, the apparatus comprising:
   an illumination unit to sequentially emit light pulses into surroundings; and
   an optical capture unit to detect the surroundings,
   wherein the illumination unit is configured such that at least two light pulses of the sequentially emitted light pulses are emitted periodically,
   wherein the at least two light pulses have light patterns that are designed to be complementary to each other,
   wherein the optical capture unit is controlled to be placed in a detecting state synchronously with the emission of the at least two light pulses, such that the optical capture unit captures an illumination area illuminated by the at least two light pulses as a detection image,
   wherein the at least two light pulses include a first light pulse and a second light pulse, wherein a first light pattern of the first light pulse has a plurality of luminous sections and non-luminous sections arranged in an alternating manner and a second light pattern of the second light pulse has a plurality of luminous sections and non-luminous sections arranged in an alternating manner, and
   wherein the first and second light patterns are designed to be complementary, such that the luminous sections of the first light pulse overlap with the non-luminous sections of the second light pulse and the non-luminous sections of the first light pulse overlap with the luminous sections of the second light pulse.

2. The apparatus according to claim 1, wherein the luminous sections and the non-luminous sections are provided with a strip-shaped design, and wherein each of the non-luminous sections are arranged between two of the luminous sections.

3. The apparatus according to claim 1, wherein the luminous sections and the non-luminous sections are designed to be of the same size.

4. The apparatus according to claim 1, wherein the luminous sections and the non-luminous sections are each designed to be straight.

5. The apparatus according to claim 1, wherein the illumination unit is designed as a headlamp, which includes a plurality of individually controllable, light-emitting elements, which are controlled such that a predefined light distribution is generated in the surroundings of a vehicle front area, and wherein the illumination unit is controlled such that the first and second light pulses are emitted at a pulse selected to be of a level that the luminous sections and the non-luminous sections generated by the fist light pulse and the second light pulse are imperceptible.

6. The apparatus according to claim 5, wherein the threshold frequency is greater than 60 Hz or greater than 100 Hz.

7. The apparatus according to claim 5, wherein the illumination unit is controlled such that the first and second light pulses are emitted at a pulse repetition frequency that is less than the pulse frequency, the predefined light distribution being emitted between the number of the first and second light pulses generating complementary light patterns.

8. The apparatus according to claim 1, wherein the first light pulse and the second light pulse form a pair of light pulses having the complementary first light patterns and second light patterns, which are emitted at a pulse repetition frequency, the pulse repetition frequency being less than a pulse frequency or less than 20% of the pulse frequency.

9. The apparatus according to claim 1, wherein light-emitting elements of the illumination unit are controlled such that the at least two light pulses are emitted continuously with the first and second light patterns, complementary to each other, each having at least one luminous section and at least one non-luminous section, and wherein a predefined light distribution is mapped by a superimposition of the first light pattern and the second light pattern.

10. A method for capturing surroundings of a vehicle, the method comprising:
    sequentially emitting light pulses to surroundings of the vehicle via an illumination unit;
    optically capturing the surroundings via an optical capture unit; and
    placing the optical capture unit in a detecting state synchronously with the emission of the light pulses, such that the optical capture unit captures a detection image of the surroundings,
    wherein the sequential emitting of the light pulses takes place periodically with different light patterns designed to be complementary to each other at a pulse frequency the different light patterns designed to be complementary such that luminous sections of a first light pulse overlap with non-luminous sections of a second light pulse and non-luminous sections of the first light pulse overlap with luminous sections of the second light pulse, and wherein the pulse frequency is selected to be of a level that a change of the luminous sections and the non-luminous sections between the emitted first and second light pulses are imperceptible to a human eye.

11. The apparatus according to claim 1 further comprising an evaluation unit to evaluate a detection signal recorded by the optical capture unit.

12. The method according to claim 10, wherein, during a pulse repetition period, the light pulses having light patterns designed to be complementary to each other are emitted as sensor light and light for generating a light distribution is emitted as useful light.

13. The method according to claim 10, wherein the illumination unit is controlled in such a way that a pulse degree as a ratio between a duration of the light pulses having complementary light patterns and a total duration of the emission of the light pulses and light for generating the light distribution is less than 10%.

14. The method according to claim 10, wherein the illumination unit is controlled in such a way that only light pulses containing complementary light patterns having a number of luminous sections and a number of non-luminous sections are emitted at the pulse frequency, the predefined light distribution being generated by superimposing the light pulses.

15. The method according to claim 10, further comprising evaluating the detection image of the surroundings to provide sensor data, so that an evaluation signal which signals a change in the surroundings is generated by comparing a detected first light pattern of the first light pulse with an emitted first light pattern of the first light pulse.

\* \* \* \* \*